(No Model.)

F. GRINNELL.
AUTOMATIC FIRE EXTINGUISHER.

No. 431,972. Patented July 8, 1890.

Witnesses.
R. L. Lovell.
A. O. Orne.

Inventor.
Frederick Grinnell.
by Brinkley & Knight
Attys.

UNITED STATES PATENT OFFICE.

FREDERICK GRINNELL, OF PROVIDENCE, RHODE ISLAND.

AUTOMATIC FIRE-EXTINGUISHER.

SPECIFICATION forming part of Letters Patent No. 431,972, dated July 8, 1890.

Application filed February 19, 1890. Serial No. 341,043. (No model.)

*To all whom it may concern:*

Be it known that I, FREDERICK GRINNELL, of Providence, in the county of Providence and State of Rhode Island, have invented a certain new and useful Improvement in Automatic Fire-Extinguishers, of which the following is a specification.

My invention is an improvement in automatic fire extinguishers or sprinklers adapted to be attached to a water-pipe and provided with an outlet closed by a valve, the valve being held to its seat by a fusible joint or other heat-actuated device, so that at a predetermined temperature the valve is released and allows the water to discharge and extinguish the fire.

My present invention relates to the valve and valve-seat, which are so constructed that the cementing or sticking together of the two valve members by deposits, corrosion, or other causes will be counteracted when the valve is released by a relative movement of the two valve members, resulting in a sudden rupture at the joint and a consequent freeing of the valve from its seat. To accomplish this I make one of the valve members with a flexible resilient bearing-edge, which will be bent out of its normal shape under the pressure of the restraining device, and which will, when released by said device, suddenly return to its normal shape, thereby sliding or turning on the other member, so as to pry apart or otherwise rupture any deposit or cement that may have accumulated at the joint, and which would, without such sudden relative movement between the valve members, be very liable to hold the valve fast to its seat.

My invention is illustrated in the accompanying drawings, in which—

Figure 1:
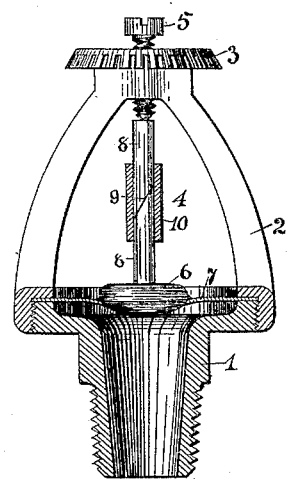
Figure 3:
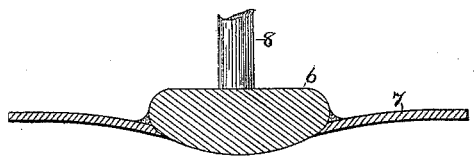
Figure 5:
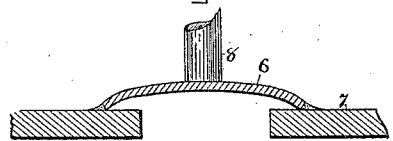
Figure 6:
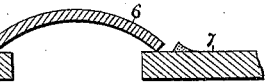
Figure 4:
Figure 2:
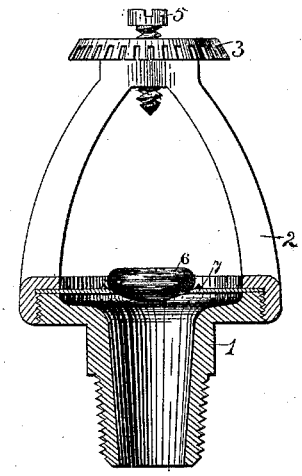

Figure 1 is a sectional view of an automatic fire-extinguisher having a flexible valve-seat. Fig. 2 is a similar view showing the valve released. Fig. 3 is an enlarged section showing the valve pressed to its seat. Fig. 4 is a similar view showing the valve released and the deposit at the joint ruptured. Fig. 5 shows a flexible valve in its normal position, and Fig. 6 shows the same when released.

The extinguisher consists of a base 1, adapted to be screwed into a pipe-fitting, an arch 2, supporting a deflecting-plate 3, a heat-actuated device 4, with an adjusting-screw 5, a valve 6, and a valve-seat 7.

The heat-actuated device 4 may consist of two bevel-ended struts 8 8, secured together at 9 by fusible solder, the joint being further held by the two half-sleeves 10, which are also secured together and to the strut by fusible solder.

In Figs. 1 to 4 I have shown a valve seated on a thin diaphragm, which is made of resilient sheet metal. This diaphragm valve-seat is made perfectly flat without any stiffening-flanges or re-enforcement of the bearing-edge, as has heretofore been customary. Its bearing-edge is therefore flexible and springy, so that when the valve is pressed down upon it it will bend out of its normal shape and assume a distorted position, as shown in Fig. 3. When the valve is released by the operation of the heat-actuated device, the diaphragm valve-seat will assume its original unstrained shape, as shown in Fig. 4, and any deposit—such as 11—that might be formed at the joint would be instantly and completely ruptured in the manner shown, so as to leave the valve free.

It will be observed that the relative movement between the valve and its seat is independent of the bodily upward movement common to both valve members. It is a combined sliding and turning movement that takes place at the joint only, and which acts with a peculiarly strong and sudden force that in practice has been found to be exceedingly effectual. It has the same good effect, whatever the sticking may be due to. Thus there may be a deposit on the inside of the sprinkler instead of on the outside, as shown, or there may be no deposit, but only a surface adhesion at the joint, which will be overcome by the movement aforesaid.

In Figs. 5 and 6 I have shown a valve made of resilient sheet metal in the form of a watch-crystal. In this case it is the valve that moves on the seat, and it will be readily seen that the action is substantially the same as shown in Figs. 3 and 4.

What I claim as new, and desire to secure by Letters Patent, is—

1. An automatic fire-extinguisher having two valve members, a valve and a valve-seat, one of the said members having a flexible resilient bearing-edge.

2. An automatic fire-extinguisher having two valve members, a valve and a valve-seat, and a heat-actuated device pressing the valve to its seat, one of the said members being thereby sprung out of its original shape, so that when the heat-actuated device releases the valve there will be a relative movement between the valve members at the joint, substantially as and for the purpose set forth.

3. An automatic fire-extinguisher comprising a valve seated upon a flexible diaphragm formed of a flat, thin, annular disk.

FREDERICK GRINNELL.

Witnesses:
FREDERICK W. HARTWELL,
WM. L. PHILLIPS.